(12) United States Patent
Miyamoto et al.

(10) Patent No.: US 6,451,099 B1
(45) Date of Patent: Sep. 17, 2002

US006451099B1

(54) WATER BASED INK COMPOSITION FOR BALL POINT PEN

(75) Inventors: Masaru Miyamoto; Tadashi Kamagata, both of Yokohama; Miki Shinozuka, Hiroshima, all of (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/555,079

(22) PCT Filed: Dec. 3, 1998

(86) PCT No.: PCT/JP98/05450

§ 371 (c)(1),
(2), (4) Date: May 23, 2000

(87) PCT Pub. No.: WO99/31188

PCT Pub. Date: Jun. 24, 1999

(30) Foreign Application Priority Data

Dec. 15, 1997 (JP) .............................................. 9-345250

(51) Int. Cl.⁷ ................................................ C09D 11/18
(52) U.S. Cl. ................................ 106/31.86; 106/31.36; 106/31.38; 106/31.58; 106/31.68; 106/31.7
(58) Field of Search .......................... 106/31.36, 31.38, 106/31.58, 31.68, 31.7, 31.86

(56) References Cited

U.S. PATENT DOCUMENTS

| 5,281,262 | A |   | 1/1994 | Saito ........................ 106/20 R |
| 6,120,590 | A | * | 9/2000 | Miyamoto et al. ......... 106/31.6 |

FOREIGN PATENT DOCUMENTS

| JP | Hei 5-186730 | 7/1993 |
| JP | Hei 5-339534 | 12/1993 |
| JP | Hei 8-302267 | 11/1996 |
| JP | Hei 9-87566 | 3/1997 |
| JP | Hei 9-221617 | 8/1997 |
| JP | Hei 10-195364 | 7/1998 |

\* cited by examiner

Primary Examiner—Helene Klemanski
Assistant Examiner—Veronica F. Faison
(74) Attorney, Agent, or Firm—Darby & Darby

(57) ABSTRACT

Provided is a water based ink composition for a ball point pen comprising at least one selected from the group consisting of an alkylene oxide adduct of polyglycerin, an alkylene oxide adduct of glycerin and an alkylene oxide adduct of trimethylolpropane and further comprising a colorant, a white plastic pigment, a viscosity-controlling agent and water. The ink composition is excellent in a writing property as well as a coloring property of the drawn lines regardless of the kind of writing paper and is stable with the passage of time. In addition thereto, it provides the drawn lines with a color having the same color tone as that of the visual color when it is charged into an ink reservoir.

6 Claims, No Drawings

WATER BASED INK COMPOSITION FOR BALL POINT PEN

TECHNICAL FIELD

The present invention relates to a water based ink composition for a ball point pen.

BACKGROUND ART

In order to know a remaining amount of an ink in a ball point pen using a water based ink, a method in which an ink itself having an increased viscosity is stored in a transparent ink reservoir of a ball point pen has so far been employed.

This water based ink composition used for a ball point pen contains a dye and/or a pigment as a colorant, and a water-soluble solvent such as a glycol and glycerin is used in addition to water of a principal solvent in order to inhibit the ink from drying at a pen tip (non-dry property). However, the water based ink composition according to the recipe described above can not provide satisfactory lubricity, and causes writing to be impossible due to abrasion of a ball housing. On the other hand, even if the satisfactory lubricity is obtained, there has been the problem that an ink is notably reduced in a surface tension, so that writings are liable to be blurred.

Then, a water based ink composition for a ball point pen comprising an alkylene oxide adduct of polyglycerin and the like, a colorant, a thickener and water was applied for a patent (Japanese Patent Application Laid-Open No. 8-302267) by the present inventors as a water based ink composition for a ball point pen which is excellent in lubricity and provides writings less liable to be blurred and which is excellent in a non-drying property.

However, this water based ink composition for a ball point pen is a little inferior in a coloring property of the drawn lines. When written on a paper face having a dark color such as black and dark blue, particularly on a paper face of a drawing paper having a coarse texture, the ink is penetrated, and the color of the drawn lines becomes a little indistinct. Further, included is the problem that the visual color observed when looking at the ink reservoir from the outside thereof is different from the color of the drawn lines, that is, the displaying property is inferior. Further, there is the problem that use of two or more kinds of colorants (pigments) having different specific gravities brings about degradation (settling of the pigments) of the ink with the passage of time.

The present invention has been made in order to solve the problems described above, and an object of the present invention is to provide a water based ink composition for a ball point pen which is excellent in an ink coloring property of the drawn lines and a displaying property and which is excellent in dispersion stability with the passage of time and has good writing feeling.

DISCLOSURE OF THE INVENTION

Intensive researches continued by the present inventors in order to solve the problems described above have resulted in successfully obtaining a water based ink composition for a ball point pen which meets the object described above by adding a specific component and a white plastic pigment to the ink composition, and thus completing the present invention.

That is, the water based ink composition of the present invention for a ball point pen comprises the following items (1) to (6).

(1) A water based ink composition for a ball point pen comprising at least one selected from the group consisting of an alkylene oxide adduct of polyglycerin, an alkylene oxide adduct of glycerin and an alkylene oxide adduct of trimethylolpropane and further comprising a colorant, a white plastic pigment, a viscosity-controlling agent and water.

(2) The water based ink composition for a ball point pen as described in the above item (1), comprising at least one selected from the group consisting of an alkylene oxide adduct of polyglycerin, an alkylene oxide adduct of glycerin and an alkylene oxide adduct of trimethylolpropane in a proportion of 0.5 to 40% by weight based on the total amount of the ink composition.

(3) The water based ink composition for a ball point pen as described in the above item (1) or (2), comprising titanium oxide as the colorant in a proportion of 0.1 to 30% by weight based on the total amount of the ink composition.

(4) The water based ink composition for a ball point pen as described in the above item (1) or (2), comprising titanium oxide as the colorant and further comprising at least one selected from the group consisting of inorganic pigments, organic pigments and pseudo-pigments prepared by coloring a resin emulsion with a dye, wherein the colorants have a content of 0.1 to 50% by weight based on the total amount of the ink composition.

(5) The water based ink composition for a ball point pen as described in any of the above items (1) to (4), comprising at least one kind of hollow resin particles having voids in the inside of the particles as the white plastic pigment in a proportion of 1.0 to 30% by weight based on the total amount of the ink composition in terms of a solid content.

(6) The water based ink composition for a ball point pen as described in any of the above items (1) to (5), comprising at least one selected from the group consisting of synthetic polymers, natural gums, celluloses and polysaccharides as the viscosity-controlling agent, wherein the viscosity at a shearing rate of $3.84 \text{ s}^{-1}$ is 300 to 4,000 mPa·s.

BEST MODE FOR CARRYING OUT THE INVENTION

The embodiment of the present invention shall be explained below in detail.

The water based ink composition for a ball point pen of the present invention is characterized by comprising at least one selected from the group consisting of an alkylene oxide adduct of polyglycerin, an alkylene oxide adduct of glycerin and an alkylene oxide adduct of trimethylolpropane and further comprising a colorant, a white plastic pigment, a viscosity-controlling agent and water.

At least one selected from the group consisting of an alkylene oxide adduct of polyglycerin, an alkylene oxide adduct of glycerin and an alkylene oxide adduct of trimethylolpropane, and a mixture thereof are used as a lubricant or a lubricity-improving agent, that is, for the purpose of improving smooth writing feeling and a grade of the drawn lines.

To describe in further details, if added in a large amount is a lubricant usually added to a water based ink composition for a ball point pen, for example, potassium linoleate, sodium ricinoleate, potassium oleate, sodium oleate and phosphoric acid esters, an adverse effect is exerted on the stability of the ink. Accordingly, in the water based ink composition for a ball point pen of the present invention, a certain amount (0.1 to 3.0% by weight based on the total amount of the ink composition) of these lubricants and the alkylene oxide adduct described above as the lubricant of the present invention is added, so that the lubricity and the stability are further improved, and the intended smooth writing feeling and a rise in the grade of the drawn lines are attained. On the other hand, when the lubricant such as sodium oleate and phosphoric acid esters is not added, the respective alkylene oxide adducts described above are not so effective as these lubricants in the water based ink composition for a ball point pen of the present invention, but provide the ink with the smoother writing feeling and a more rise in the grade of the drawn lines than the case of adding no lubricants without exerting an adverse effect on the stability of the ink as the lubricity-improving agent.

In the present invention, the respective alkylene oxide adducts described above have a content of 0.5 to 40% by weight, preferably 5 to 20% by weight based on the total amount of the ink composition.

The alkylene oxide adduct of polyglycerin is obtained by adding 1 to 60 moles of alkylene oxide to polyglycerin having a polymerization degree of 2 to 4 and includes, for example, at least one obtained by adding 1 to 60 moles of ethylene oxide, propylene oxide or a mixture thereof to a polymer of 2 to 4 moles of glycerin such as diglycerin and triglycerin.

The alkylene oxide adduct of glycerin is obtained by adding 1 to 150 moles, preferably 11 to 60 moles of alkylene oxide to glycerin and includes, for example, at least one obtained by adding 1 to 150 moles of ethylene oxide, propylene oxide or a mixture thereof to glycerin.

Further, the alkylene oxide adduct of trimethylolpropane is obtained by adding 1 to 60 moles of alkylene oxide to trimethylolpropane and includes, for example, at least one obtained by adding 1 to 60 moles of ethylene oxide, propylene oxide or a mixture thereof to trimethylolpropane.

If one of these alkylene oxide adducts or a mixture of two or more kinds of them has a content of less than 0.5% by weight based on the total amount of the ink composition, the lubricity is unsatisfactory, so that the smooth writing feeling can not be obtained. On the other hand, if it exceeds 40% by weight, the ink is liable to penetrate into a paper surface, and the satisfactory covering property can not be obtained. Accordingly, both the contents are not preferred.

The colorant used in the present invention includes at least one selected from titanium oxide, which is excellent as a white pigment and has an excellent covering property, inorganic pigments, organic pigments and pseudo-pigments obtained by coloring resin emulsions with dyes.

In addition to titanium oxide described above, inorganic pigments include, for example, carbon black and metal powders. Organic pigments include, for example, azo lake, insoluble azo pigments, chelate azo pigments, phthalocyanine pigments, perylene and perinone pigments, anthraquinone pigments, quinacridone pigments, dye lakes, nitro pigments and nitroso pigments.

To be specific, included are inorganic pigments such as carbon black, titanium black, zinc oxide, red iron oxide, chromium oxide, black iron oxide, cobalt blue, yellow iron oxide, viridian, zinc sulfide, lithopone, cadmium yellow, cadmium red, vermilion, chrome yellow, molybdate orange, zinc chromate, strontium chromate, white carbon, clay, talc, ultramarine, precipitated barium sulfate, baryte powder, calcium carbonate, white lead, Prussian blue, manganese violet, aluminum powder and bronze powder; C. I. Pigment Blue 1, C. I. Pigment Blue 15, C. I. Pigment Blue 17, C. I. Pigment Blue 27, C. I. Pigment Red 5, C. I. Pigment Red 22, C. I. Pigment Red 38, C. I. Pigment Red 48, C. I. Pigment Red 49, C. I. Pigment Red 53, C. I. Pigment Red 57, C. I. Pigment Red 81, C. I. Pigment Red 104, C. I. Pigment Red 146, C. I. Pigment Red 245, C. I. Pigment Yellow 1, C. I. Pigment Yellow 3, C. I. Pigment Yellow 12, C. I. Pigment Yellow 13, C. I. Pigment Yellow 14, C. I. Pigment Yellow 17, C. I. Pigment Yellow 34, C. I. Pigment Yellow 55, C. I. Pigment Yellow 74, C. I. Pigment Yellow 83, C. I. Pigment Yellow 95, C. I. Pigment Yellow 166, C. I. Pigment Yellow 167, C. I. Pigment Orange 5, C. I. Pigment Orange 13, C. I. Pigment Orange 16, C. I. Pigment Violet 1, C. I. Pigment Violet 3, C. I. Pigment Violet 19, C. I. Pigment Violet 23, C. I. Pigment Violet 50, and C. I. Pigment Green 7.

The pseudo-pigment obtained by coloring a resin emulsion with a dye provides the ink with coloring stability and a fluorescent color having high saturation and includes, for example, those obtained by coloring resins comprising copolymers of acrylonitrile, styrene and methyl methacrylate with dyes.

When titanium oxide is used as the colorant, it is added preferably in a proportion of 0.1 to 30% by weight, more preferably 1 to 25% by weight based on the total amount of the ink composition.

Further, when at least one selected from the group consisting of the foregoing inorganic pigments, organic pigments and pseudo-pigments obtained by coloring a resin emulsion with a dye is further added as a colorant in addition to titanium oxide (0.1 to 30% by weight based on the total amount of the ink composition), it is added preferably in a proportion of 0.1 to 50% by weight, more preferably 5 to 40% by weight based on the total amount of the ink composition.

If the respective colorants described above have a content of less than 0.1% in total, the covering effect of titanium oxide and the coloring of the ink run short. On the other hand, if titanium oxide has a content exceeding 30% by weight, clogging is caused at the point of the tip, so that the ink is not discharged in a certain case. Accordingly, such a content is not preferred.

The white plastic pigment used in the present invention is used for the purpose of improving the coloring property of the drawn lines by virtue of the covering effect on a writing surface regardless of the kind of writing paper and includes, for example, a packed type and hollow resin particles.

The white plastic pigment of the packed type scatters efficiently light as compared with spherical particles by changing the forms of the particles, for example, forming irregularities on the surface of the resins or changing the shape of the particles, whereby whiteness is elevated.

On the other hand, the white plastic pigment comprising the hollow resin particles has small voids in the inside of the particles and scatters efficiently light by virtue of a difference in a refractive index between the resin layer in the outside and the void in the inside, whereby the whiteness is elevated.

The packed type pigment includes products on the market such as "U-pearl C-201", "U-pearl C-120", "U-pearl S-201" and "U-pearl S-122R" (urea resin particles), "Glossdell 240V" (red blood cell type oblate particles) and "Glossdell 110M" (fine particle aggregation type) manufactured by Mitsui Chemicals Inc., "Nipol LX407BP" and "Nipol LX407BP6" manufactured by Nippon Zeon Co., Ltd., "Parnoc CFB200W" manufactured by Dainippon Ink and Chemicals, Inc. and "EAX Color" manufactured by Sekisui Chemical Co., Ltd.

The hollow resin particles which have small voids in the inside of the particles and scatter efficiently light by virtue of a difference in a refractive index between the resin layer in the outside and the void in the inside to thereby allow the whiteness to be elevated include, for example, products on the market such as "Glossdell 1003E" manufactured by Mitsui Chemicals, Inc., "MH-5055" manufactured by Nippon Zeon Co., Ltd., "Ropaque OP-84J", "Ropaque OP-62" and "Ropaque HP-91" manufactured by Rohm & Haas Co., Ltd., "VONCAT PP-100", "VONCAT-EXP PP-199" and "VONCAT EXP PP-207S" manufactured by Dainippon Ink and Chemicals Inc., and "SX-863A", "SX-862B", "SX-863B", "SX-864B", "SX-865B" and "SX-856C" manufactured by Japan Synthetic Rubber Co., Ltd.

These white plastic pigments can be used alone or in a mixture of two or more kinds thereof and have a content of 1.0 to 30% by weight, preferably 5 to 20% by weight in terms of a solid content based on the total amount of the ink composition.

If the white plastic pigment has a content of less than 0.1% by weight, the expected whiteness can not be obtained. On the other hand, if it exceeds 30% by weight, the writing property (writing feeling) is deteriorated. Accordingly, both contents are not preferred.

The viscosity-controlling agent used in the present invention includes at least one selected from synthetic polymers, natural gums, celluloses and polysaccharides.

The synthetic polymers include, for example, polyacrylic acid and cross-linking type copolymers thereof, polyvinyl alcohol, polyvinylpyrrolidone and derivatives thereof, and polyvinyl methyl ether and derivatives thereof. The natural gums and polysaccharides include, for example, tragacanth gum, guar gum, locust bean gum and xanthan gum. The celluloses include methyl cellulose, ethyl cellulose, hydroxyethyl cellulose and carboxymethyl cellulose.

To be specific, included are products on the market such as "Junron PW-111" manufactured by Nippon Pure Chemicals Ind. Co., Ltd., "Hiviswako 104" manufactured by Wako Pure Chemical Industries Ltd., "KELZAN", "KELZAN AR", K1A96", K1A112", "RHEOZAN" and "K7C233" manufactured by Sansho Co., Ltd., "JUGAR HP-8", "JUGAR HP-60", "RHODOPOL 23" and "RHODOPOL 50MC" manufactured by Rhone Poulenc Japan, Ltd., and "Echo Gum GM" manufactured by Dainippon Pharmaceutical Co., Ltd.

The content of these viscosity-controlling agents shall suitably be increased or decreased depending on the viscosity of the ink which shall be described later.

Water as the solvent used in the present invention shall not specifically be restricted and includes purified water and ion-exchanged water. It has a content of 20 to 60% by weight.

As other components used in the present invention, if necessary, capable of being suitably selected and used are, for example, pH adjusting agents such as ammonia, urea, monoethanolamine, diethanolamine, triethanolamine, alkali metal salts of carbonic acid and phosphoric acid such as sodium tripolyphosphate and sodium carbonate, and hydroxides of alkali metals such as sodium hydroxide; preservatives or fungicides such as phenol, sodium omadine, sodium pentachlorophenol, 1,2-benzisothiazoline-3-one, 2,3,5,6-tetrachloro-4-(methylsulfonyl)pyridine, alkali metal salts of benzoic acid, sorbic acid and dehydroacetic acid such as sodium benzoate, and benzimidazole base compounds; rust preventives such as benzotriazole, dicyclohexylammonium nitrite, diisopropylammonium nitrite and tolyltriazole; derivatives of polyoxyethylene, polyoxypropylene or polyoxyethylenepolyoxypropylene such as polyoxyethylene lauryl ether, derivatives of glycerin, diglycerin or polyglycerin such as tetraglyceryl distearate, sorbitan derivatives such as sorbitan monooleate, and surfactants having fluorinated alkyl groups such as perfluoroalkylphosphoric acid esters; lubricants and wetting agents such as calcium linoleate, sodium ricinoleate, potassium oleate, sodium oleate, phosphoric acid esters, and polyether-modified silicones including polyethylene glycol adducts of dimethylpolysiloxane; and defoaming agents.

In the ink composition of the present invention for a ball point pen, if the ink viscosity is a value exceeding 4,000 mPa·s at a low shearing rate (3.84 s$^{-1}$), the discharge amount of the ink in writing is reduced, and therefore it is not preferred.

Accordingly, it is effective that the viscosity at a shearing rate of 3.84 s$^{-1}$ falls in a range of 300 to 4,000 mPa·s, preferably 600 to 2,500 mPa·s.

A shearing rate which can be applied to a conventional rotary type viscometer falls in a range of 1.92 to 3.84 s$^{-1}$, and in the present invention, a measured value at 3.84 s$^{-1}$ has been employed considering stability of the measured value.

The ink composition for a ball point pen of the present invention-thus constituted is very excellent in a writing property by adding the alkylene oxide adducts of polyglycerin and the like and excellent in an ink coloring property of the drawn lines regardless of the kind of writing paper by containing the white plastic pigment. By adding at least one selected from the group consisting of the preceding alkylene oxide adducts of polyglycerin and the like, which are the essential components, the colorant, the white plastic pigment, the viscosity-controlling agent and water, the ink exhibits the effects that it is excellent in an ink coloring property of the drawn lines and a displaying property as well as dispersion stability with the passage of time and that it is improved in writing feeling. If at least one of the essential components described above is not added, the effects described above are not exerted (this point shall further be explained in detail in the examples described later).

Further, in the present invention, the effects described above are exhibited without using water-soluble organic solvents other than water, such as glycol and glycerin, and therefore provided is the advantage that instability with the passage of time observed when the water-soluble organic solvents are used can be prevented.

EXAMPLES

The present invention shall be explained below in detail with reference to examples and comparative examples, but it is a matter of course that the present invention shall by no means be restricted by these examples."Percentage by weight" of a blending unit shall be abbreviated below merely as [%].

Example 1

An ink composition according to the following recipe was prepared:

| | |
|---|---|
| MH-5055 (white plastic pigment, acryl-styrene copolymer, solid content: 30%, manufactured by Nippon Zeon Co., Ltd.) | 57.0% |
| Phthalocyanine green (colorant) | 1.0% |
| Phosphanol LE-700 (lubricant) | 0.6% |

| | |
|---|---|
| (phosphoric acid ester, manufactured by Toho Chemical Industry Co., Ltd.) | |
| Ethylene oxide 13 mol adduct of diglycerin | 20.0% |
| Hiviswako 104 (viscosity-controlling agent, manufactured by Wako Pure Chemical Industries, Ltd.) | 0.3% |
| Water (purified water) | balance |

The blended composition described above was stirred and then filtered to obtain an ink composition for a ball point pen.

Example 2

An ink composition according to the following recipe was prepared:

| | |
|---|---|
| Titanix JR-701 (titanium oxide, manufactured by Tayca Corporation) | 20.0% |
| OP-62 (white plastic pigment, acryl-styrene copolymer, solid content: 37.5%, manufactured by Rohm & Haas Co., Ltd.) | 40.0% |
| Phthalocyanine blue (colorant) | 1.0% |
| Phosphanol RD-510Y (lubricant) (phosphoric acid ester, manufactured by Toho Chemical Industry Co., Ltd.) | 0.8% |
| Propylene oxide 4 mol adduct of diglycerin | 10.0% |
| JUGAR HP-60 (viscosity-controlling agent, guar gum, manufactured by Rhone Poulenc Japan, Ltd.) | 0.3% |
| Water (purified water) | balance |

The blended Composition described above was stirred and then filtered to obtain an ink composition for a ball point pen.

Example 3

An ink composition according to the following recipe was prepared:

| | |
|---|---|
| Tipure R-900 (titanium oxide, manufactured by Du Pont Co., Ltd.) | 17.0% |
| OP-84J (white plastic pigment, acryl-styrene copolymer, solid content: 42.5%, manufactured by Rohm & Haas Co., Ltd.) | 40.0% |
| Lumikol 2300 (pseudo-pigment, solid content: 50%, manufactured by Nihon Keiko Co., Ltd.) | 10.0% |
| Potassium oleate (lubricant) | 1.0% |
| Propylene oxide 10 mol adduct of triglycerin | 7.0% |
| KELZAN (xanthan gum, manufactured by Sansho Co., Ltd.) | 0.3% |
| Water (purified water) | balance |

The blended composition described above was stirred and then filtered to obtain an ink composition for a ball point pen.

Example 4

An ink composition according to the following recipe was prepared:

| | |
|---|---|
| KR-380N (titanium oxide, manufactured by Titan Kogyo Kabushiki Kaisha) | 22.0% |
| Glossdell 240V (white plastic pigment, red blood cell type oblate particles, solid content: 43.3%, manufactured by Mitsui Chemicals Inc.) | 23.0% |
| Disazo Yellow (colorant) | 1.0% |
| Potassium linoleate (lubricant) | 1.0% |
| Ethylene oxide 20 mol adduct of glycerin | 8.5% |
| K1A112 (viscosity-controlling agent, rhamsan gum, manufactured by Sansho Co., Ltd.) | 0.3% |
| Water (purified water) | balance |

The blended composition described above was stirred and then filtered to obtain an ink composition for a ball point pen.

Comparative Example 1

An ink composition according to the following recipe was prepared:

| | |
|---|---|
| KR-380N (titanium oxide, manufactured by Titan Kogyo Kabushiki Kaisha) | 17.0% |
| OP-62 (white plastic pigment, acryl-styrene copolymer, solid content: 37.5%, manufactured by Rohm & Haas Co., Ltd.) | 45.0% |
| Phthalocyanine blue (colorant) | 1.0% |
| Phosphanol RD-510Y (lubricant) (phosphoric acid ester, manufactured by Toho Chemical Industry Co., Ltd.) | 0.6% |
| Ethylene oxide 13 mol adduct of diglycerin | 10.0% |
| Water (purified water) | balance |

The blended composition described above was stirred and then filtered to obtain an ink composition for a ball point pen.

Comparative Example 2

An ink composition according to the following recipe was prepared:

| | |
|---|---|
| Tipure R-900 (titanium oxide, manufactured by Du Pont Co., Ltd.) | 22.0% |
| Phthalocyanine green (colorant) | 1.0% |
| Phosphanol LE-700 (lubricant) (phosphoric acid ester, manufactured by Toho Chemical Industry Co., Ltd.) | 0.6% |
| Ethylene oxide 20 mol adduct of glycerin | 10.0% |
| K1A112 (viscosity-controlling agent, rhamsan gum, manufactured by Sansho Co., Ltd.) | 0.3% |
| Water (purified water) | balance |

The blended composition described above was stirred and then filtered to obtain an ink composition for a ball point pen.

Comparative Example 3

An ink composition according to the following recipe was prepared:

| | |
|---|---|
| Titanix JR-701 (titanium oxide, manufactured by Tayca Corporation) | 20.0% |
| Glossdell 240V (white plastic pigment, red blood cell type oblate particles, solid content: 43.3% manufactured by Mitsui Chemicals Inc.) | 23.0% |
| Disazo Yellow (colorant) | 1.0% |
| Potassium linoleate (lubricant) | 1.0% |
| KELZAN (viscosity-controlling agent, xanthan gum, manufactured by Sansho Co., Ltd.) | 0.3% |
| Water (purified water) | balance |

The blended composition described above was stirred and then filtered to obtain an ink composition for a ball point pen.

Comparative Example 4

An ink composition according to the following recipe was prepared:

| | |
|---|---|
| Naphthol red (colorant) | 7.0% |
| Potassium linoleate (lubricant) | 1.0% |
| Propylene oxide 4 mol adduct of diglycerin | 15.0% |
| JUGAR HP-60 (viscosity-controlling agent, guar gum, manufactured by Rhone Poulenc Japan, Ltd.) | 0.3% |
| Water (purified water) | balance |

The blended composition described above was stirred and then filtered to obtain an ink composition for a ball point pen.

Eight kinds of the ink compositions obtained in Examples 1 to 4 and Comparative Examples 1 to 4 were subjected to a stability test with the passage of time, a writing test, an ink coloring test of the drawn lines and a test for a difference in the hues (displaying property). The results thereof are shown in the following Table 1 and Table 2.

(1) Stability with the Passage of Time

The viscosity was measured by means of an EMD type viscometer at a shearing rate of $3.84\ s^{-1}$ within a week and after left standing at room temperature for 6 months after preparing the ink. Further, the appearance after left standing for 6 months was visually observed to evaluate the presence of abnormality such as precipitation.

(2) Writing Test (Writing Feeling Test)

The ink was filled into a refill comprising a polypropylene-made ink reservoir having an inner diameter of 3.5 mm and a length of 100 mm and having no feed and a stainless steel-made tip having a ball diameter of 0.7 mm to prepare a ball point pen for evaluation.

This ball point pen for evaluation was used for writing to evaluate the writing feeling and the writing performance according to the following evaluation criteria.

Evaluation Criteria for Writing Feeling

○: smooth writing feeling

Δ: inconveniences such as heavy writing feeling and scratching are present, but usable level X: unpleasant feeling such as very heavy writing feeling and scratching is given, and unusable level unable to write normally and incapable of evaluating the writing feeling Evaluation Criteria for Writing Performance ○: capable of writing normally, and regular drawn lines are obtained X: unable to write normally; regular drawn lines are not obtained and writing becomes impossible due to starving and clogging (3) Ink Coloring Test of the Drawn Lines The ball point pen for evaluation obtained above was used to write on a Xerox M paper (absorbent paper), a black coat paper (non-absorbent paper) and a black drawing paper (absorbent paper: New Color No. 418 manufactured by Shikoku Paper Co., Ltd.) to evaluate with eyes the coloring property of the drawn lines according to the following evaluation criteria.

Evaluation Criteria

Evaluation was carried out according to the following three grade evaluation criteria.

○: clear coloring is obtained

Δ: ink is penetrated into paper surface, and base color of writing paper can be observed X: drawn lines can scarcely be observed (4) Difference Test of Hue (Displaying Property)

The presence of a difference in the hues (displaying property) between the visual color of the ball point pens for evaluation obtained above and the color of the drawn lines was evaluated according to the following evaluation criteria.

Evaluation Criteria for Displaying Property

○: visual color observed when the ink is filled into the ball point pen is consistent with the color of the drawn lines X: visual color is not consistent with the color of the drawn lines

TABLE 1

| | | Stability of ink with passage of time | | |
|---|---|---|---|---|
| | | Viscosity (mPa·s) | | Appearance Presence of |
| | | Initial | After 6 months | precipitation |
| Example | 1 | 600 | 680 | None |
| | 2 | 1500 | 1650 | None |
| | 3 | 1900 | 2010 | None |
| | 4 | 1900 | 2100 | None |
| Comparative Example | 1 | 50 | — | Present |
| | 2 | 1800 | 3500 | Present |
| | 3 | 1400 | 4010 | None |
| | 4 | 1000 | 1210 | None |

Comments on Table 1

As apparent from the results shown in Table 1 described above, it has been found that in Examples 1 to 4 falling in the scope of the present invention, a change in the ink viscosity is almost stable as compared with Comparative Examples 1 to 4 falling outside the scope of the present invention and that precipitation of the pigments is not caused.

In contrast with this, Comparative Example 1 is a case where out of the alkylene oxide adduct which is an essential component in the present invention, the colorant, the white plastic pigment, the viscosity-controlling agent and water, the viscosity-controlling agent is not added; Comparative Example 2 and Comparative Example 4 are cases where the white plastic pigment is not added; and Comparative Example 3 is a case where the alkylene oxide adduct is not added. It has been found that in Comparative Example 1 and Comparative Example 2, precipitation of the pigments is caused and that in Comparative Example 3, the ink viscosity is notably increased.

TABLE 2

|  | Initial | After 6 months | | Ink coloring property of drawn lines | | | |
| --- | --- | --- | --- | --- | --- | --- | --- |
|  | Writing feeling | Writing | Writing feeling | Xerox M paper | Black drawing paper | Coat paper | Displaying property |
| Example | | | | | | | |
| 1 | ○ | ○ | ○ | ○ | Δ | ○ | ○ |
| 2 | ○ | ○ | ○ | ○ | ○ | ○ | ○ |
| 3 | ○ | ○ | ○ | ○ | ○ | ○ | ○ |
| 4 | ○ | ○ | ○ | ○ | ○ | ○ | ○ |
| Comparative Example | | | | | | | |
| 1 | ○ | X | — | X | X | ○ | ○ |
| 2 | X | X | — | X | X | ○ | ○ |
| 3 | Δ | ○ | Δ | ○ | ○ | ○ | ○ |
| 4 | ○ | ○ | ○ | X | X | X | X |

Comments on Table 2

As apparent from the results shown in Table 2 described above, in Comparative Example 1 and Comparative Example 2, the writing becomes impossible at the initial stage or after 6 months. In two kinds of these inks, coloring on absorbent paper as well exhibits inferior results. Also, it has been found that in Comparative Example 3, the writing is possible but the writing feeling is apparently inferior as compared with four kinds of inks in Examples 1 to 4. Further, it has been found that in Comparative Example 4, both of the displaying property and the coloring property are inferior.

To synthetically evaluate the results shown in Table 1 and Table 2 described above, it has been found that the water based ink compositions for a ball point pen prepared in Examples 1 to 4 falling in the scope of the present invention can be judged as very good inks in terms of stability with the passage of time, a writing test (writing feeling and the like), an ink coloring property of the drawn lines and a displaying property as compared with Comparative Examples 1 to 4 falling outside the scope of the present invention.

INDUSTRIAL APPLICABILITY

The water based ink composition of the present invention is an ink which is excellent in a writing property as well as an ink coloring property of the drawn lines regardless of the kind of writing paper and which is stable with the passage of time. In addition thereto, the ink provides the drawn lines with a color having the same color tone as that of the visual color when it is charged into an ink reservoir in which the ink can visually be observed from the outside, and is suitably used as a water based ink composition for a ball point pen.

What is claimed is:

1. A water based ink composition for a ball point pen comprising at least one selected from the group consisting of an alkylene oxide adduct of polyglycerin, an alkylene oxide adduct of glycerin and an alkylene oxide adduct of trimethylolpropane and further comprising a colorant, a white plastic pigment, a viscosity-controlling agent and water.

2. The water based ink composition for a ball point pen as described in claim 1, comprising at least one selected from the group consisting of an alkylene oxide adduct of polyglycerin, an alkylene oxide adduct of glycerin and an alkylene oxide adduct of trimethylolpropane in a proportion of 0.5 to 40% by weight based on the total amount of the ink composition.

3. The water based ink composition for a ball point pen as described in claim 1 or 2, comprising titanium oxide as the colorant in a proportion of 0.1 to 30% by weight based on the total amount of the ink composition.

4. The water based ink composition for a ball point pen of claim 1, wherein the colorant is selected from the group consisting of inorganic pigments, organic, and pseudo-pigments prepared by coloring a resin emulsion with a dye or a combination thereof, and wherein the combination of the colorant and the titanium oxide is present in a range of 0.1 to 50% by weight based on the total weight of the ink composition.

5. The water based ink composition for a ball point pen as described in any of claims 1 to 4, comprising at least one kind of hollow resin particles having voids in the inside of the particles as the white plastic pigment in a proportion of 1.0 to 30% by weight based on the total amount of the ink composition in terms of a solid content.

6. The water based ink composition for a ball point pen as described in any of claims 1 to 5, comprising at least one selected from the group consisting of synthetic polymers, natural gums, celluloses and polysaccharides as the viscosity-controlling agent, wherein the viscosity at a shearing rate of 3.84 s$^{-1}$ is 300 to 4,000 mPa·s.

* * * * *

UNITED STATES PATENT AND TRADEMARK OFFICE
CERTIFICATE OF CORRECTION

PATENT NO. : 6,451,099 B1
DATED : September 17, 2002
INVENTOR(S) : Masaru Miyamoto et al.

It is certified that error appears in the above-identified patent and that said Letters Patent is hereby corrected as shown below:

Column 11,
Line 57, after "comprising", insert -- titanium oxide --.
Line 67, delete "or 2".
Line 67, delete "as the colorant".

Column 12,
Line 20, delete "as the colorant".
Line 31, delete "any of claims 1 to 4" and substitute -- claim 1 --.
Line 37, delete "any of claims 1 to 5" and substitute -- claim 1 --.

Signed and Sealed this

Tenth Day of June, 2003

JAMES E. ROGAN
*Director of the United States Patent and Trademark Office*